Patented Jan. 23, 1951

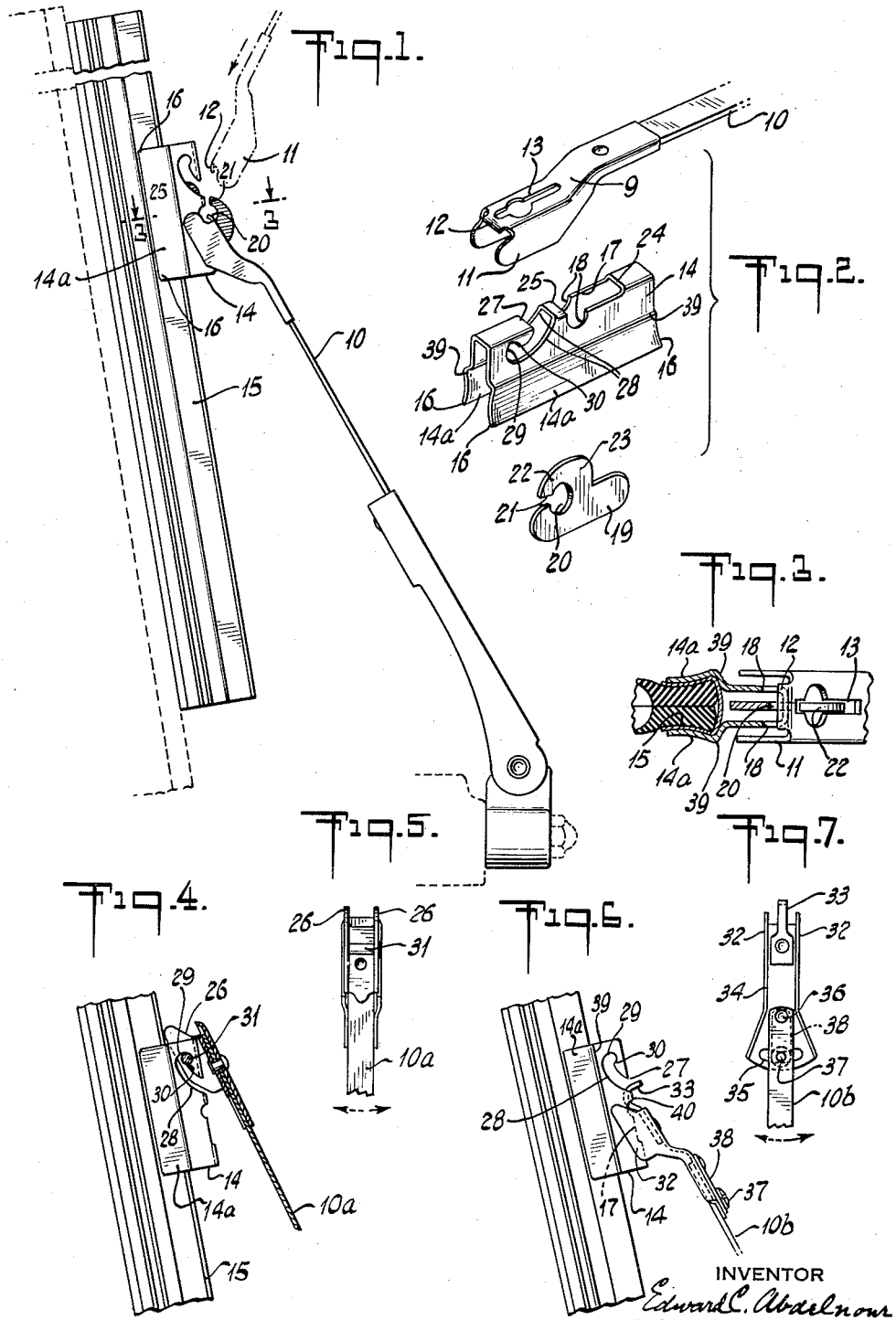

2,539,219

UNITED STATES PATENT OFFICE 2,539,219

CONNECTOR FOR CONNECTING A BLADE TO A WINDSHIELD WIPER ARM

Edward C. Abdelnour, New Rochelle, N. Y., assignor to The Sleetex Company, Inc., New York, N. Y., a corporation of New York Application June 24, 1947, Serial No. 756,748

1 Claim. (Cl. 15—250)

The present invention relates to windshield wipers and more particularly to devices for connecting the wiper element or blade to the reciprocating wiper arm. The wiper blades of all makes of windshield wipers commonly wear out, or are lost, stolen, or broken. Many are so designed that only the same kind or make of blades can be used as replacements. This requires dealers to carry a stock of replacement blades for each type and make of windshield wiper; or if they do not, the car used is handicapped in readily obtaining a replacement for a type or make of blade which is not in stock or is carried by only a few dealers.

One object of the present invention has been to provide a connecting element which can be employed to connect a wiper blade to any of various makes of wiper arms now found as standard equipment on many cars. The blades originally supplied with these various embodiments are not generally interchangeable from one make of wiper arm to another. It is contemplated that a connector according to the present invention, will reduce the dealers' need for excessive inventories of wiper blades and will promote the convenience and safety of the auto user by enabling him to replace a wiper blade more readily than is now the case.

A further object of the invention has been to provide a connector of the kind above referred to and which, although relatively inexpensive and of simple construction, supplies a durable and effective device for mounting a wiper blade on a wiper arm.

In this specification and the accompanying drawings I have shown and described a preferred embodiment of my invention and suggested various modifications thereof; but it is to be understood that these are not intended to be exhaustive nor limiting of the invention but, on the contrary, are given for purposes of illustration in order that others skilled in the art may fully understand the invention and the principles thereof and the manner of applying it in various forms, each as may be best suited to the conditions of a particular use.

Other advantages and contemplated benefits in manufacture and use will more fully appear from the following description of said preferred embodiment and the appended drawings wherein:

Figure 1 is a side view of one form of connector as applied to a commonly used type of wiper arm;

Figure 2, an exploded view on enlarged scale and in perspective of the parts of the connector shown in Figure 1 and of end portions of a wiper arm with which said connector parts are engaged when assembled, as in Figure 1;

Figure 3, a transverse section, on enlarged scale, on the line 3—3 of Figure 1;

Figure 4, a fragmentary view, in side elevation of a modification, as applied to a type and make of wiper arm different from that shown in Figure 1;

Figure 5, a fragmentary plan view of the structure shown in Figure 4;

Figure 6, a fragmentary view in side elevation of the connector of Figures 4 and 5, applied to a type of wiper arm different from that shown in Figures 1 to 5 inclusive; and Figure 7, a fragmentary plan view of the structure shown in Figure 6.

Referring now to Figure 2 of the drawings, a connector embodying the present invention provides devices arranged and adapted to releasably engage an end fitting 9 of one well known form of windshield wiper arm 10. Said end fitting 9 includes depending side flanges 11, a front cross piece 12, and a slot 13.

Said connector includes a U-shaped clip or saddle generally indicated as 14 of suitable resilient material as sheet metal, preferably capable of being die cut and pressed to shape, and having a web portion and opposed lateral wall portions 14a extending therefrom and arranged and adapted to embrace and frictionally engage the metal channel or back 15, Figure 1, of a known form of windshield wiper blade, such for example as that shown in U. S. Patent No. 2,234,709.

End or corner portions 16 of said lateral walls 14a are flared outwardly to facilitate the sliding of said connector into position on the back 15 with its lateral wall portions 14a embracing and frictionally gripping an intermediate portion thereof.

Said saddle or clip 14 has a portion cut away to form an opening 17 in the top wall or web portion thereof, as viewed in Figure 2, and opposed openings 18 in the lateral walls thereof adjacent to and in communication with said opening 17.

A latch plate 19 is provided with a hole 20 which has a restricted opening 21 through an edge portion of such size and shape that, when operatively assembled in said clip with the latter in position on back 15, its hook portion 22 extends through said opening 17 in the direction shown in Figure 1. Said latch or plate 19, when in operative position as just described, has endwise movement limited to the extent that the neck portion 23 of hook 22 may be moved between the end limits 24 and 25 of said opening 17.

To attach a wiper blade provided with the clip 14 and latch 19, as above described, to a wiper arm of the type shown in Figures 1 and 2, for example, the cross piece 12 of said arm 10 is moved from the dotted line position, Figure 1, through the opening 21 of latch 19 and into the hole 20 of said plate. In actual use, i. e., with the arm 10 in place on the car, it will be more convenient to lift the free end of arm 10 away from the windshield and move the wiper blade, clip 14 and latch 19 in such manner that the cross piece 12 engages hole 20 of latch 19. The blade is then swung to windshield engaging position which brings the end fitting 9 with its lateral flanges 11 in straddling relation to portions of said clip 14. With either mode of attachment, the parts are assembled in operative relation to the windshield in the relative positions shown in Figure 1. As so shown, the cross piece 12 cannot become accidentally disengaged from hook 22 regardless of any usual endwise or lateral pressures or strains on the wiper blade or which are not violent enough to break or mutilate the connecting parts.

The type of wiper arm, 10a, Figures 4 and 5, includes an end piece having depending lateral flanges 26 and a cross pin 31 secured to and connecting said flanges. To facilitate the use of a wiper blade of the type shown, the connector clip 14 previously described has a portion of its web or end wall and portions of its side walls cut away or punched out to form the approximately rectangular shaped opening 27 in its web or end wall. Opposed irregularly shaped slots communicating at one end with said opening 27 are formed with relatively long portions 28 extending obliquely from said opening 27 and relatively short terminal portions 29 disposed at an angle to said long portions 28 and forming shoulders 30. Said rectangular openings 17 and 27 are preferably located in the relative positions, as shown in Figure 2, to provide advantages which will more fully appear in connection with the description of the devices shown in Figures 6 and 7. However, so far as useful cooperation of the connector parts last described with the flanges 26 and cross pin 31 of the particular type of wiper arm shown in Figures 4 and 5 is concerned, the relative positions of said openings 17 and 27 are not critical.

To attach wiper arm 10a to the illustrated connector clip with latch 19 omitted or removed, that portion of cross pin 31 which extends between the opposed inner faces of the flanges 26 is moved through opening 27 while the free end of said arm 10a is raised sufficiently from the windshield. With the pin 31 engaging the open ends of slots 29, the wiper blade is moved in a general direction approximately parallel with the longitudinal axis of arm 10a to bring said pin 31 behind said shoulders 30 and with the lateral flanges 26 straddling a portion of clip 14.

It is one of the advantageous features of this construction that the attachment is secure whether, by reference to the positions of the parts as shown in Figure 4, the blade is moved downwardly in relation to pin 31 to bring said pin behind the shoulders 30, or, with the connector frame reversed, said blade is moved upwardly in relation to pin 31. In either case, as the wiper blade is moved or released into normal wiping contact with the outer surface of the windshield, there is relative rocking movement between said blade and said arm 10a which brings them into approximately the angular relation indicated in Figure 4 of the drawings; or such that, with the free end of arm 10a biased toward the windshield by spring means, and thereby pressing the wiper firmly against the windshield, a feature common to practically all commercial wiper devices, pin 31 remains effectively but releasably engaged with shoulder 30 and the end portion 29 of slot 28.

It is noted that the connector clip 14 is in effect a spring clamp with its lateral walls 14a biased inwardly to frictionally grip back 15 of the wiper arms as 10, 10a, 10b. Said walls 14a are also flared outwardly to provide shoulders 39, inner surfaces of which bear upon said back 15. As shown in Figure 4, front end edge portions of flanges 26, which embrace an end portion of the connector clip 14, extend beyond pin 31 and bear on outer portions of said shoulders 39 with a kind of camming action which further tends to hold pin 31 in snug engagement with shoulder 30 and the end portion 29 of slot 28.

Another common type of wiper arm, as 10b, Figures 6 and 7, is provided at its outer end with fittings which include the lateral flanges 32 rounded at their forward or outer ends and a hook 33, said hook and said flanges forming parts of a terminal member 34 having a slot 35 and pivoted to arm 10b at 36. A screw 37 having a portion extending through slot 35 and cooperating with a plate 38, serves to secure said terminal 34 in any desired position of angular adjustment on arm 10b within the limits of relative movement of pin 37 in slot 35. Where the connector clip 14 is provided with the opening 17 for the purposes previously stated in describing the devices of Figures 1, 2 and 3, and with the opening 27 for the purposes stated in describing the devices of Figures 4 and 5, in the relative positions shown in the drawings, a cross piece 40, Figure 6, is formed between said openings. Accordingly, to engage the connector clip to an arm, as 10b, the end of hook 33 thereof is inserted into either of said openings 17 or 27 and brought under the cross piece 40 after which the parts are further positioned to bring said flanges of terminal 34 into straddling relation to portions of clip 14.

Thus, a wiper blade equipped with a connector clip having the features shown and described may be effectively attached not only to various types of widely used wiper arms; but the arrangement is such that, with some types of wiper arms, as in Figures 4 to 7, inclusive, the connection can be made quickly because the engaging movement of slot 28 with pin 31, Figure 4, is either down or up, and the engagement of hook 33 with cross piece 40, Figure 6, is effected through either of the openings 17 or 27.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

A device for releasably connecting wiper blades to the reciprocating arms of windshield wipers comprising a clip attachable to a wiper blade and having a web and side walls, said web having openings therein which are spaced apart longitudinally thereof and arranged and adapted to form a cross piece at each end of the clip and a cross piece between said openings, said side walls having two sets of opposed openings, one set thereof communicating with one of said web openings, and the other set thereof communicating with the other of said web openings, and one of said sets of opposed side wall openings including slots each having an oblique portion extending in a direction away from the plane of the web and toward one end thereof and a terminal portion extending obliquely in a direction toward said web to form in effect a set of opposed undercut shoulders which provide retaining hooks connected by one of said end cross pieces.

EDWARD C. ABDELNOUR.

REFERENCES CITED

The following references are of record in the file of this patent:

UNITED STATES PATENTS

| Number | Name | Date |
| --- | --- | --- |
| 2,156,506 | Marcolivio | May 2, 1939 |
| 2,295,011 | Rodrick | Sept. 8, 1942 |